United States Patent [19]
Sipila et al.

[11] Patent Number: 6,134,439
[45] Date of Patent: Oct. 17, 2000

[54] DECT/GSM EXTERNAL HANDOVER

[75] Inventors: Tuomo Sipila; Markus Tapani Hakaste, both of Helsinki, Finland

[73] Assignee: Nokia Mobile Phones Limited, Espoo, Finland

[21] Appl. No.: 08/949,013

[22] Filed: Oct. 10, 1997

[30] Foreign Application Priority Data

Oct. 11, 1996 [GB] United Kingdom .................. 9621247

[51] Int. Cl.[7] ..................................................... H04Q 7/38
[52] U.S. Cl. ........................................... 455/436; 455/442
[58] Field of Search ..................................... 455/436, 439, 455/524, 525, 560, 437, 438, 440–444; 370/331

[56] References Cited

U.S. PATENT DOCUMENTS

| | | | |
|---|---|---|---|
| 5,212,684 | 5/1993 | MacNamee et al. | 455/426 |
| 5,659,598 | 8/1997 | Byrne et al. | 455/436 |
| 5,737,703 | 4/1998 | Byrne | 455/442 |
| 5,873,033 | 2/1999 | Hjern et al. | 455/417 |
| 5,878,036 | 3/1999 | Spartz et al. | 370/335 |
| 5,878,343 | 3/1999 | Robert et al. | 455/424 |
| 5,884,173 | 3/1999 | Sollner | 455/436 |

FOREIGN PATENT DOCUMENTS

| | | |
|---|---|---|
| 0 777 396 A1 | 6/1997 | European Pat. Off. . |
| 2 296 632 | 7/1996 | United Kingdom . |
| 2296632 | 7/1996 | United Kingdom . |

OTHER PUBLICATIONS

European Search Report, dated Jun. 10, 1999, 2 pages.

DECT System as an Extension to GSM Infrastructure, Antero Alvesalo, pp. 201–206.

"Radio Equipment and Systems (RES); Digital Enhanced Cordless Telecommunications/Global System for Mobile communications (DECT/GSM) interworking profile; Profile overview", ETSI ETR 341 Dec. 1996.

"Radio Equipment and Systems (RES); Digital Enhanced Cordless Telecommunications/Global System for Mobile Communications (DECT/GSM) interworking profile; Mobile services Switching Centre (MSC)–Fixed Part (FP) interconnection" ETSI ETS 300 499 Sep. 1996.

"Digital Enhanced Cordless Telecommunications (DECT); Global System for Mobile communications (GSM); DECT/GSM Interworking Profile (IWP); implementation of facsimile group 3", ETSI ETS 300 792 Jun. 1997.

ETS 300 175–1 $2^{nd}$ edition: "Radio Equipment and Systems (RES); Digital European Cordless Telecommunications (DECT) Common Interface Part 1: Overview".

ETS 300 175–2 $2^{nd}$ edition: "Radio Equipment and Systems (RES); Digital European Cordless Telecommunications (DECT) Common Interface Part 2: Physical layer".

ETS 300 175–3 $2^{nd}$ edition: "Radio Equipment and Systems (RES); Digital European Cordless Telecommunications (DECT) Common Interface Part 3: Medium access control layer".

ETS 300 175–4 $2^{nd}$ edition: "Radio Equipment and Systems (RES); Digital European Cordless Telecommunications (DECT) Common Interface Part 4: Data link control layer".

ETS 300 175–5 $2^{nd}$ edition: "Radio Equipment and Systems (RES); Digital European Cordless Telecommunications (DECT) Common Interface Part 5: Network layer".

(List continued on next page.)

*Primary Examiner*—Reinhard J. Eisenzopf
*Assistant Examiner*—Duc Nguyen
*Attorney, Agent, or Firm*—Perman & Green, LLP

[57] ABSTRACT

A method for controlling handover of a DECT portable part from a first DECT fixed part to a second DECT fixed part during provision of a data service, both fixed parts communicating with a GSM mobile switch center, the method comprising the first fixed part detecting that the handover has been requested, and in response modifying its control of the link between itself and the mobile switch center to inhibit acknowledgement to the mobile switch center of data not received by the portable part from the first fixed part.

17 Claims, 12 Drawing Sheets

OTHER PUBLICATIONS

ETS 300 175–6 $2^{nd}$ edition: "Radio Equipment and Systems (RES); Digital European Cordless Telecommunications (DECT) Common Interface Part 6: Identities and addressing".

ETS 300 175–7 $2^{nd}$ edition: "Radio Equipment and Systems (RES); Digital European Cordless Telecommunications (DECT) Common Interface Part 7: Security features".

ETS 300 175–8 $2^{nd}$ edition: "Radio Equipment and Systems (RES); Digital European Cordless Telecommunications (DECT) Common Interface Part 8: Speech coding and transmission".

ETR 015: "Digital European Cordless Telecommunications Reference document".

ETR 043: "Radio Equipment and Systems (RES); Digital European Cordless Telecommunications (DECT) Common Interface Services and Facilities requirements specification".

ETR 056: "Digital European Cordless Telecommunications System description document".

ETS 300 370 $2^{nd}$ edition: Radio Equipment and Systems (RES); Digital European Cordless Telecommunications/ Global System for Mobile Communications (DECT/GSM) Interworking profile, Access and mapping (Protocol/procedure description for 3.1 KHz speech service).

prETS 300 499: "Radio Equipment and Systems (RES); Digital European Cordless Telecommunications/Global System for Mobile Communications (DECT/GSM) Interworking profile GSM MSC—DECT FP Fixed interconnection".

(DE/RES–03071) (Sep. 1995): "Radio Equipment and Systems; Digital European Cordless Telecommunications (DECT),/Global System for Mobile Communications (DECT/GSM) interworking profile, Implementation of bearer services".

(DE/RES–03050) (Jun. 1995); "Radio Equipment and Systems (RES); Digital European Cordless Telecommunications/Global System for Mobile Communications (DECT/GSM) Interworking profile, GSM Phase 2 supplementary services implementation".

(DE/RES–03057): "Radio Equipment and Systems (RES); Digital European Ccordless Telecommunications/Global System for Mobile Communications (DECT/GSM) Interworking profile, Implementation of Short message services, point to point and Cell broadcast".

prETS 300 651: "Radio Equipment and Systems (RES); Digital European Cordless Telecommunications (DECT) Data services profile, Generic data link service, Service Type C, Class 2".

prETS 300 435: "Radio Equipment and Systems (RES); Digital European Cordless Telecommunications (DECT) Data Services Profile Base Standard including inter–working to connectionless networks (service types A and B, Class 1)".

GSM 04.22: "Radio Link Protocol (RLP) for data and telematic services on the Mobile Station–Base Station Systems (BSS–MSC) interface".

prETS 300 701: "Radio Equipment and Systems (RES); Digital European Cordless Telecommunications (DECT) Data Services Profile Generic Frame relay service with mobility (service types A and B, Class 2)".

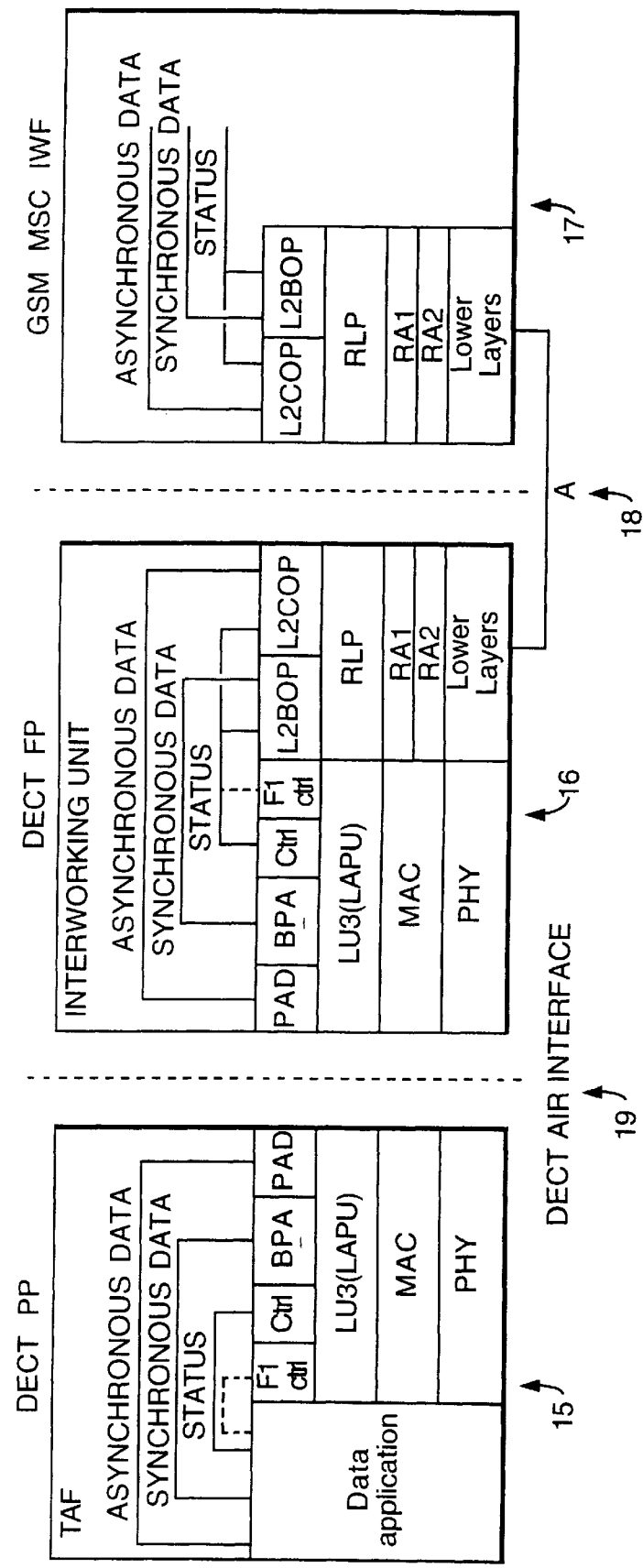

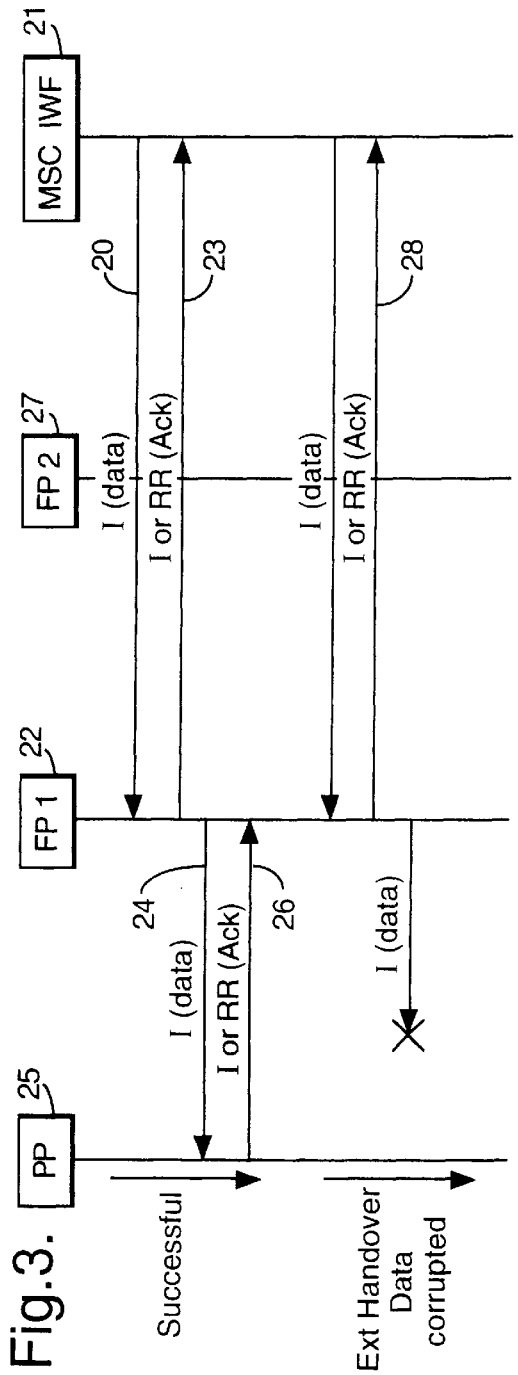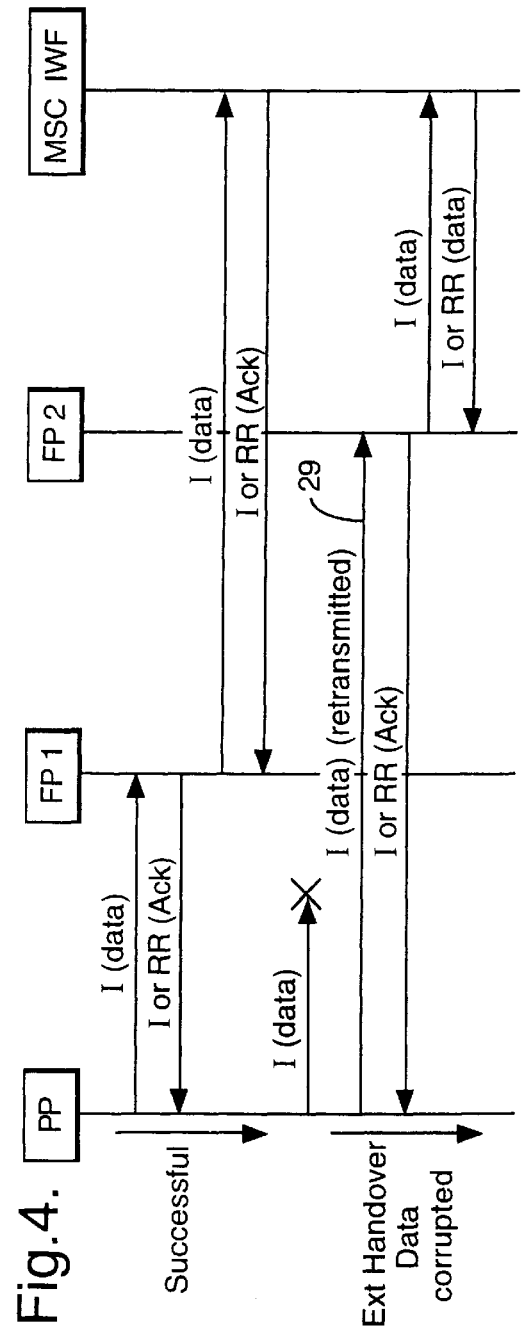

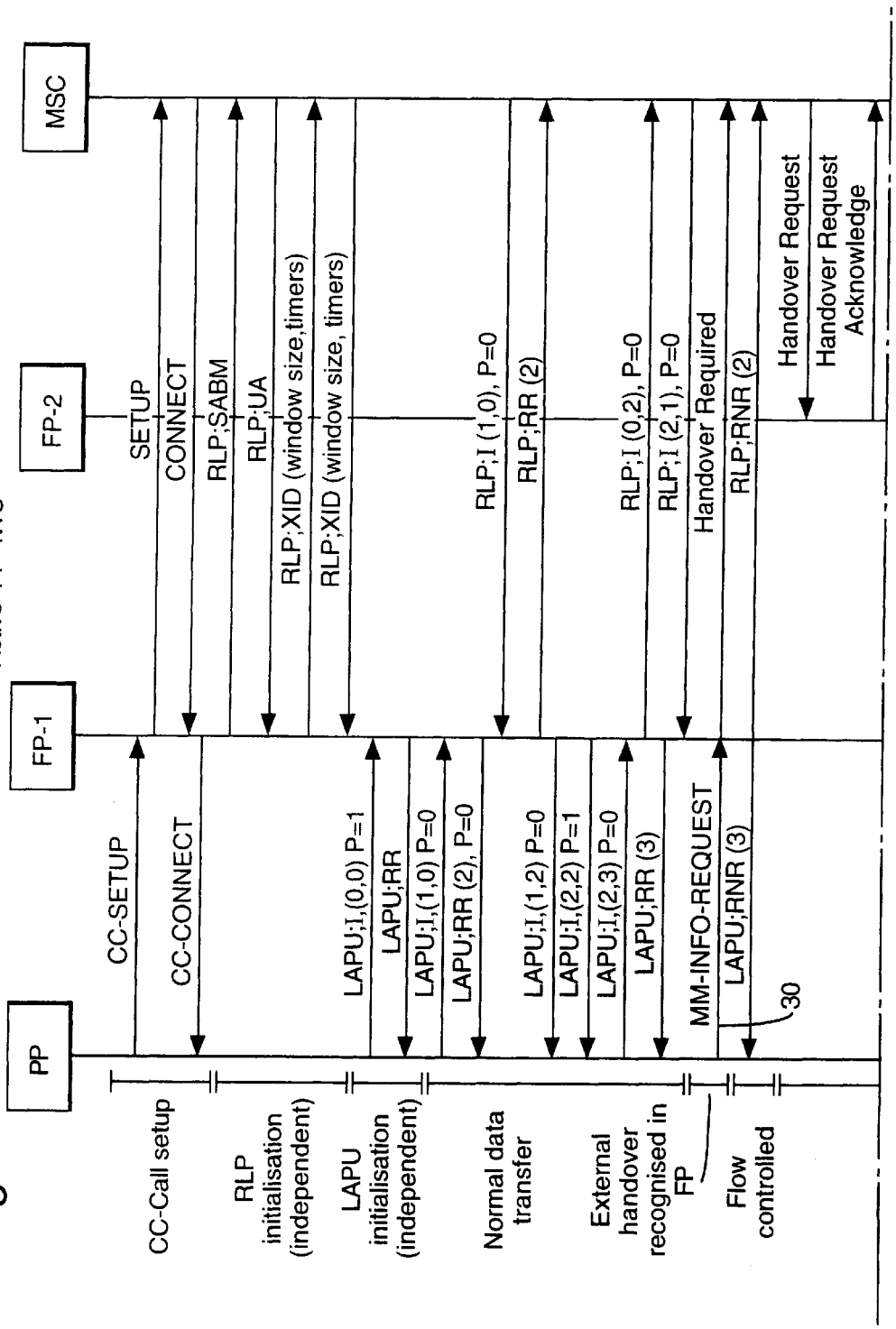

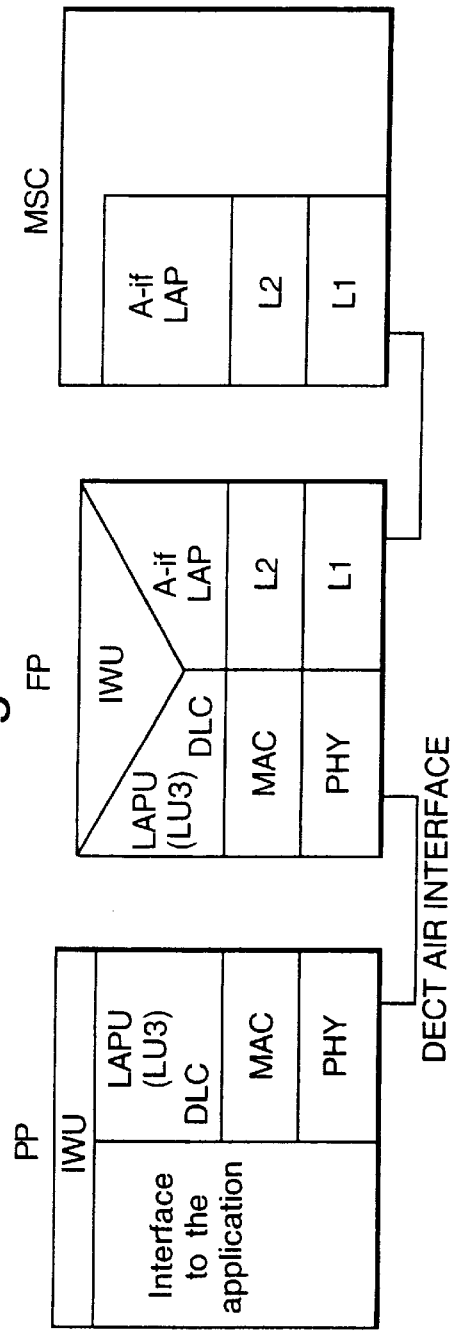
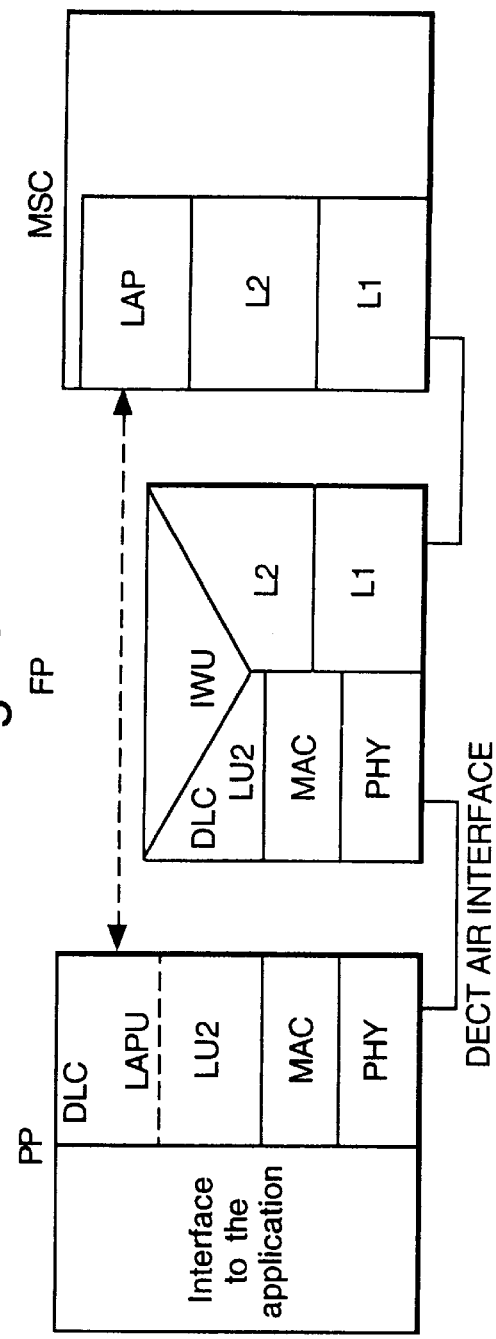

DECT/GSM EXTERNAL HANDOVER

FIELD OF INVENTION

This invention relates to external handover during DECT/GSM interworking, and especially to preventing loss of data during external handover.

BACKGROUND OF INVENTION

FIG. 1 illustrates two DECT (digital European cordless telephone) communication systems interworking with a GSM (global system for mobiles) communication system. The DECT systems each comprise a fixed part 1,2. Each fixed part comprises a cluster control fixed part (CCFP) 3,4 and radio fixed parts (RFP) 5,6,7,8, each of which is connected to the respective CCFP. The CCFPs are connected over an A-interface 9 to a GSM mobile service centre (MSC) 10. DECT portable part (PP) handsets 11,12 can communicate wirelessly with the RFPs when they are in range. When a portable part moves from the range of one RFP (the "old" RFP) to the range of another RFP (the "new" RFP) there is a need for handover of the wireless communications with the portable part. When the handover is between two RFPs that are under the control of the same CCFP (handover 13 in FIG. 1) this can be handled by the DECT system in a procedure called internal handover, with data loss protection. When the handover is between two RFPs that are under the control of different CCFPs anchored by the MSC (handover 14 in FIG. 1) the procedure is known as external handover.

Document [14] cited below defines the implementation of bearer services. This takes as its basis that in the DECT/GSM interface the GSM error correcting protocol RLP is terminated to the interworking unit (IWU) of the DECT fixed part, and the DECT air interface (based on the C data profile) provides its own error correction over the DECT air interface by re-transmitting the MAC (medium access control) layer protocol and by the DLC (data link control) layer re-transmitting the LAPU protocol. This protocol model is illustrated in FIG. 2, where block 15 represents the DECT portable part, block 16 represents the DECT fixed part and block 17 represents the GSM mobile switch centre interworking unit. Thus, in this standard implementation the RLP and LAPU protocols function independently; the RLP protocol operating over the A-interface (18 in FIG. 2) between GSM and DECT and the LAPU protocol operating over the DECT air interface (19 in FIG. 2). The LAPU protocol runs all the way from the CCFP to the PP, so situations where data might be lost in DECT internal handover can be taken care of either by the DECT MAC layer error correction or by the LAPU. However, error correction in the event of external handover is unclear.

In this document the protocol used for the provision of GSM non-transparent service is referred to as the GSM A-interface LAP protocol. A current example of this protocol is RLP but other protocols (such as V.120) could be used in the future. In some situations in this document the RLP has been used as an example.

In the past, specifications for DECT/GSM interworking have not taken care of external handover. However, there is a possibility that data could be lost if external handover takes place whilst data is being transferred. This is because the RLP and LAPU systems function independently. The MSC receives acknowledgement (sent by the DECT fixed part) of a sent data frame before the frame has reached its final destination (the portable part). If external handover has occurred and the frame has been sent to the wrong CCFP then it cannot be sent to the portable part.

FIG. 3 Illustrates the situation where in a data service—in which the system carries signals representing data that has been provided to the system in a digital form by a user of the DECT portable part, or that is to be provided by the system to that user in a digital form—data frames (I-frames) are being transferred in the mobile terminated direction (i.e. in the direction from the MSC to FP) and then, using the DECT LAPU, over the DECT air interface, The first I-frame is passed at 20 from the interworking function of the MSC 21 to the first fixed part (FP1) 22. FP1 acknowledges the received frame at 23 and then forwards the data at 24 using DECT LAPU to the portable part 25. The PP acknowledges the data at 26. If an external handover of the PP from FP1 to FP2 (at 27) then occurs the FP1 will acknowledge (at 28) the next frame to the MSC but will not be able to send it to the PP. And FP2 cannot re-send the data to the PP because it does not have the frame. In addition, in the IWF the GSM LAP send window has been incremented after successful I-frame acknowledgement and the data has been lost from the RLP buffers.

FIG. 4 illustrates the situation of mobile originated transmission. In this case no data loss can occur because the PP can re-transmit the data (at 29) to FP2. However, the PP has to be able to continue the same LAPU connection over the new U-plane link, so the interworking unit of FP2 has to be able to know the status of the state variables (the send and receive counters) of the old link.

Thus the greater problem is encountered when data is being sent towards the portable part (PP) during external handover.

One aim of this invention is to address this problem.

SUMMARY OF THE INVENTION

According to the present invention from one aspect there is provided a method for controlling handover of a DECT portable part from a first DECT fixed part to a second DECT fixed part during provision of a data service, both fixed parts communicating with a GSM mobile switch centre, the method comprising the first fixed part detecting that the handover has been requested, and in response modifying its control of the link between itself and the mobile switch centre to inhibit acknowledgement to the mobile switch centre of data not received by the portable part from the first fixed part.

Preferably the first fixed part may detect that handover has been requested by detecting a request from the portable part (e.g. an {MM-INFO-REQUEST}) or a command from the mobile switch centre (e.g. a {HANDOVER COMMAND}).

Upon handover of the portable part to the second fixed part the second fixed part preferably applies a reset to the link with the mobile switch centre. This reset preferably resets the RLP entity over the link. The link is suitably reset by means of a SABM message.

In response to detecting that the handover has been requested the first fixed part preferably flow controls the link between itself and the mobile switch centre. The first fixed part may flow control the U-plane and/or the RLP and/or data flow. The flow control may be exercised by using bit X. Upon handover of the portable part to the second fixed part the second fixed part preferably releases flow control on the link with the mobile switch centre.

Preferably an interworking unit of the fixed part performs the said modification of control.

As is described in more detail below, one preferred method uses one or more of the following steps:

upon detection of the external handover procedure the interworking unit of the "old" fixed part flow controls the RLP and/or the data flow using the bit X and sends the remaining data in its buffers to the portable part over the LAPU link;

data can then be sent to the MSC direction as long as the U-plane link is present to empty the FP1 IWU buffers;

a new RLP entity is created in the "new" fixed part IWU when the link between it and the MSC is established after the DECT U-plane LAPU link has been initiated;

upon establishment of the link between the "new" fixed part IWU and the MSC IWF the "new" FP IWU resets the RLP link by issuing a SABM command and releases the flow control if it has not yet been released:

then the data traffic via the "new" fixed part IWU proceeds as normal.

According to the present invention from a second aspect there is provided a method for controlling handover of a DECT portable part from a first DECT fixed part to a second DECT fixed part during provision of a data service, both fixed parts communicating with a GSM mobile switch centre, the method comprising the first fixed part relaying protocol messages between its link with the portable part and its link with the mobile switch centre according to a predetermined mapping, to inhibit acknowledgement to the mobile switch centre of data not received by the portable part from the first fixed part.

Preferably the mapping is a one-to-one mapping between protocol messages of the two said links. The mapping suitably includes at least one of the following mappings:

RECEIVE READY mapped to RECEIVE READY;

RECEIVE NOT READY mapped to RECEIVE NOT READY;

data frame (for example DECT I-frame) mapped to data frame (for example RLP I+S-frame).

The said protocol messages of the link between the first fixed part and the portable part are preferably DECT LAPU protocol messages. The said protocol messages of the link between the first fixed part and the mobile switch centre are preferably GSM LAP protocol messages, for example RLP messages.

According to the present invention from a third aspect there is provided a communications system comprising: a GSM mobile switch centre; a DECT fixed part in communication with the mobile switch centre; and a DECT portable part in communication with the fixed part; wherein in at least the provision of data service communications to the portable part a protocol is applied all the way between the mobile switch centre and the portable part.

Preferably the said protocol is the GSM LAP protocol, in which case the portable part preferably includes means for encoding and decoding signals according to the said protocol. The said protocol may suitably provide for the division of data into frames and each of those frames is communicated between the portable part and the fixed part in a single DECT data link control frame.

The said protocol may be the DECT LAPU protocol, in which case the mobile switch centre preferably includes means for encoding and decoding signals according to the said protocol.

Preferably the fixed part includes an interworking unit which does not encode or decode signals according to the protocol. Preferably at the level of the protocol the signals pass unaltered through the fixed part.

Preferably the methods and system according to the present invention are for avoiding, reducing or at least inhibiting loss of data if external handover occurs during the provision of data services to the DECT portable part—when the portable part is transmitting or receiving signals representing digital information.

DESCRIPTION OF DRAWINGS

FIG. 2 shows the protocol stack for standard DECT/GSM non-transparent bearer services interworking;

FIG. 3 illustrates the possibility of data loss when frames are being conveyed to a DECT portable part;

FIG. 4 illustrates the possibility of data loss when frames are being conveyed from a DECT portable part;

FIG. 10 shows a protocol stack for the situation of DECT-GSM LAP protocol mapping;

FIG. 13 shows a protocol stack for the use of the LAPU protocol data between the GSM mobile switch centre and the DECT portable part.

DETAILED DESCRIPTION OF EMBODIMENTS OF THE INVENTION

Figure 1:
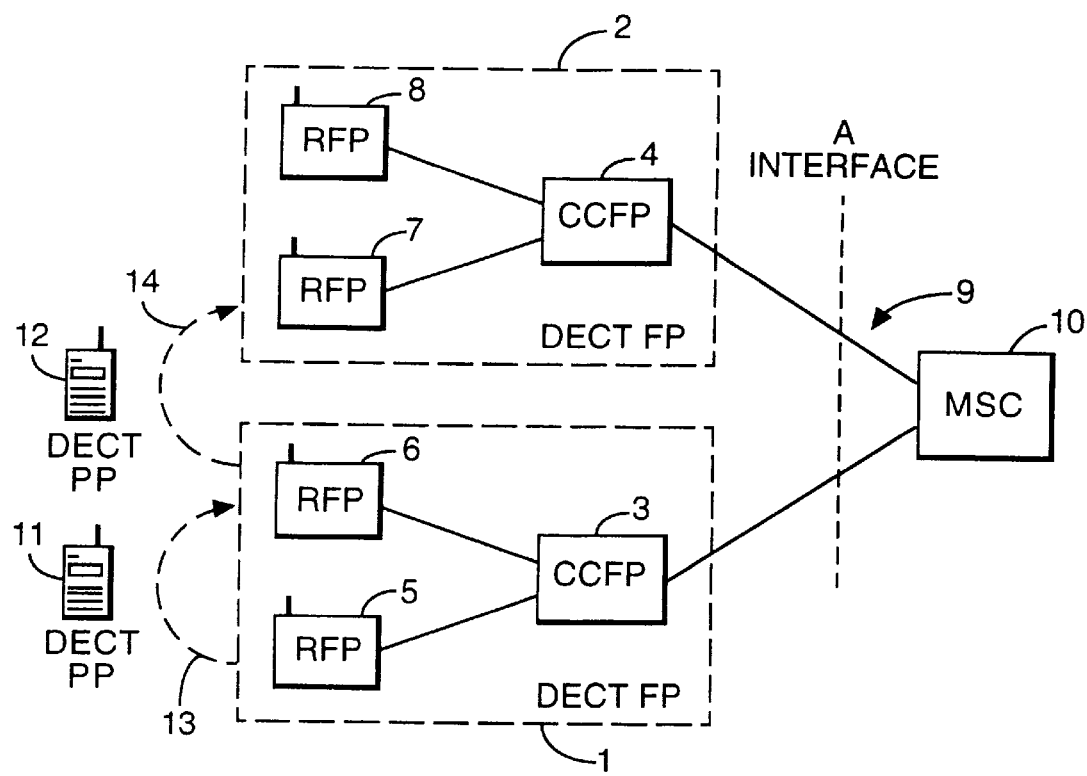
FIG. 1 shows two DECT fixed parts interworking with a GSM system.

The present invention will now be described by way of example with reference to the accompanying drawings.

The problem described above can be divided into three subparts:

1. How is GSM A-interface LAP and RLP interworking handled?
2. How should the LAPU function during external handover? Should it continue its operation over the new DECT air interface link, and if so how should the LAPU status be conveyed to the new FP? Alternatively, should a new LAPU be initialised?
3. How should the RLP function in the new FP (the FP receiving the PP) after an external handover? Should the RLP be reset or should it try to continue from the old situation?

The specification in document [5] does not limit the occurrence of external handover. During a voice call external handover is closely related to the U-plane connection: if the U-plane has not yet been connected, external handover is not likely to occur. External handover may occur in different phases of a call or call establishment. It has been specified that a connection should be established to the new FP in parallel to the old connection. In the best case the old connection is released normally by the FP sending {CC-RELEASE} with an indication for "external handover release". However, it is possible that the connection to the old FP might cut off in the middle of the external handover procedure (e.g. due to a bad connection), leading to data loss. In this situation the PP has up to 5 seconds to attempt an external handover into a new FP. Establishment of a connection can be done according to the parameters already received in the call establishment phase of the original call, or with the MM procedures.

Four approaches will now be described to external handover in a DECT/GSM hybrid system, with the aim of reducing data loss during a non-transparent bearer service transfer.

1. The external handover mechanism is implemented transparently in DECT/GSM without any FP intervention, and the LAP protocol is used over the A-interface (for example, RLP is conveyed all the way to the DECT PP). Then if external handover occurs the A-interface LAP (RLP) re-transmission scheme can be used automatically end-to-end.
2. The FP IWU recognises an external handover situation and during the process of external handover behaves differently from normal by not providing to the MSC IWF acknowledgement of transmission of the A-interface LAP frame. This can lead to a re-transmission of the messages (data frames) to the new FP.
3. The C data profile LAPU layer is used by the DECT air interface to map the A-interface LAP layer acknowledgements. This leads to acknowledge transmissions all the way to the DECT PP. If external handover occurs the RLP re-transmission scheme can be utilised automatically.
4. LAPU can run all the way to the MSC. This would require changes in the MSC IWF and a representation of an open A-interface.

The first approach is based on the idea that the GSM A-interface LAP (for instance the RLP re-transmission scheme) is run end-to-end between the PP and the IWF. This requires full GSM LAP (RLP) protocol support in the PP. In the second and third solutions both the DECT and the GSM parts of the data transfer use their own LAP protocols. In the second solution strict mapping between these protocols is required. The fourth solution uses the DECT specific LAP protocol end-to-end and full support of LAPU in the GSM IWF is required.

The approaches will now be described in more detail.

Approach 1: GSM LAP Protocol is Run All the Way to the PP

Figure 5:
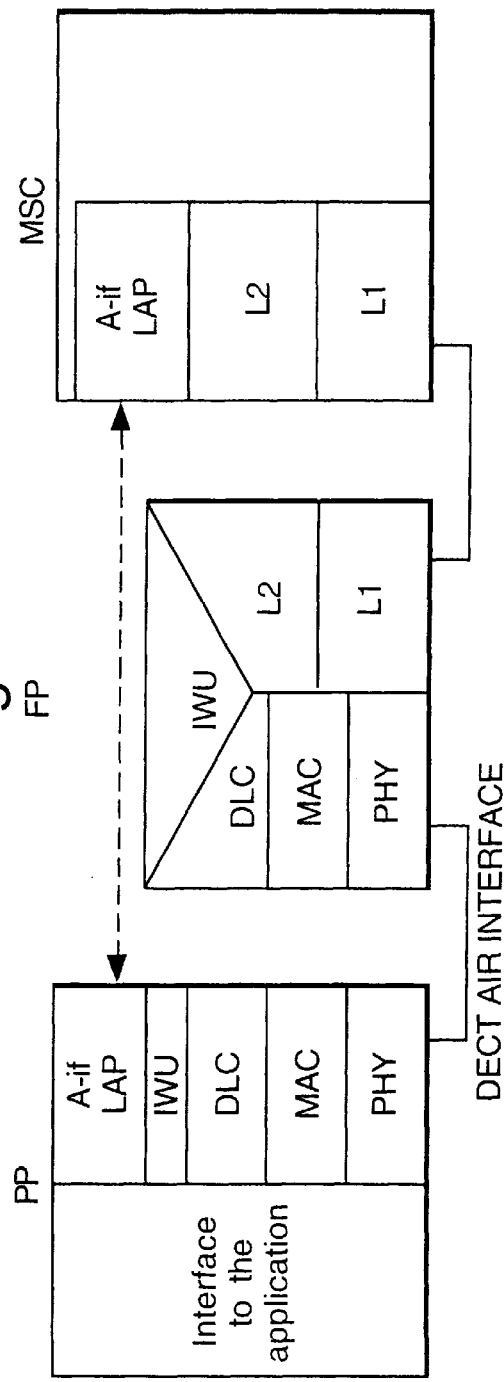
FIG. 5 shows a protocol stack for the situation where the GSM LAP protocol is run to the DECT portable part.

In this approach the GSM LAP protocol, used over the A-interface, is conveyed over the DECT air interface and data error recovery is done end-to-end between the PP and the GSM IWF. The general arrangement is shown in FIG. 5. An air interface protocol must be defined for the provision of (for example) RLP over the DECT air interface. An example of such a protocol is discussed below. It is preferable that the data frame to be used (for example the RLP data frame) fits exactly into the DLC layer frame so as to use the DECT air interface protocol most efficiently.

There are three options for implementing this approach: using the DLC LU1 service, using DECT data profiles and using the DLC LU7 service.

DLC LU1 Service

The DLC LU1 service with the FU1 frame is used for normal speech transmissions. However, it could also be used for data transmissions. One option is to use the DLC LU1 service with the non-protected or unprotected service of the MAC layer. Thus, GSM data is transferred without modifications through the DECT air interface.

When non-transparent data is transferred the RLP frame with a length of 240 bits (30 bytes) has to be fitted into the FU1 frame. If the non-transparent nature is to be maintained, no part of the frame can be cut off: for instance the FCS field is needed for error detection. The net data rate that can be reached has been calculated in the same way as in GSM: i.e. the rate is the actual user data rate and is shown in the following table. Since the RLP frame does not fit exactly into the FU1 frame some fill octets have to be added to the end of the frame. A 240 bit RLP is one example of RLP frame size. Other frame sizes may be used such as 476 or 576 bit frames.

| MAC layer mode | FU1 size | RLP frames | Net user data transmission rate in DECT air interface |
| --- | --- | --- | --- |
| full slot/non-protected | 40 bytes | 1 frame + 10 byte fill | 19.2 kbps |
| double slot/non-protected | 100 bytes | 3 frames + 10 byte fill | 57.6 kbps |
| full slot/protected | 32 bytes | 1 frame + 2 byte fill | 19.2 kbps |
| double slot/protected | 80 bytes | 2 frames + 20 byte fill | 38.4 kbps |

Figure 6:
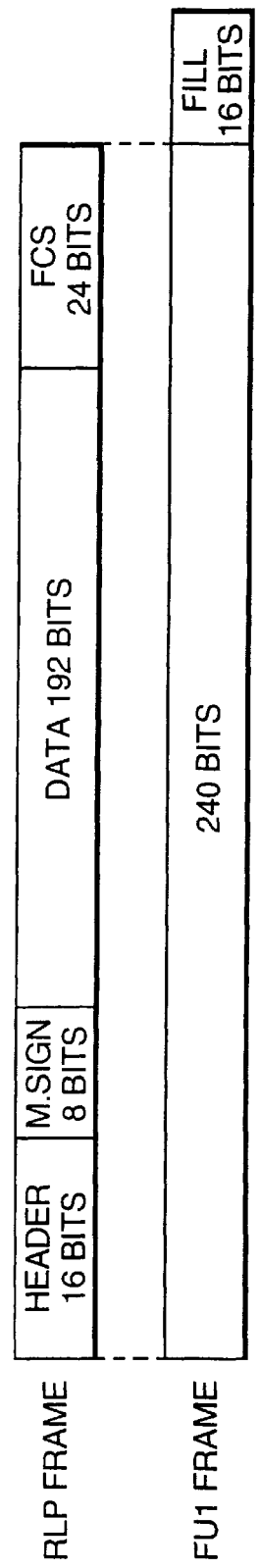
FIG. 6 shows the fitting of an RLP frame into the FU1 frame of the LU1 service.

FIG. 6 illustrates the full slot/protected case, where an RLP frame of 240 bits is fitted into an FU1 frame with 16 fill bits.

As the table above shows, the DECT system with a single slot can easily provide the required minimum GSM rate, currently 9.6 kbps (9.6 kilobits per second). It can even be used for higher rates e.g. 14.4 kbit/s, so this DECT interworking approach can be used with future GSM services, such as GSM HSCSD and enhanced DECT/GSM bearer services.

The data rates depend on the frame sizes. Throughput can be increased by allocating more timeslots. When additional timeslots are used the data rate is a multiple of those provided with one time slot.

This option has the following advantages:

Easy implementation, especially if non-protected single slots are used and the air interface solution can be based on the standard DECT voice implementation with minor changes.

The system is fundamentally based on the GSM system, while DECT is merely a bearer of GSM data. This is especially attractive for DECT/GSM dual model. terminals, which can use the GSM RLP protocol entity.

DECT Data Profiles

This option uses the A/B data profile (see documents [19] and [22]) or the C data profile (see document [20]) with the RLP. The A/B and the C profile use FU6 frames with length and sequence fields and the MAC Ip error correction service. The service adds a CRC check field of 16 bits to the end of the packet. In the C profile an additional two octets are used for header information, The size of the FU6 frame is 32 bytes with 2 bytes of control information, leaving 30 bytes for the data.

Figure 7:
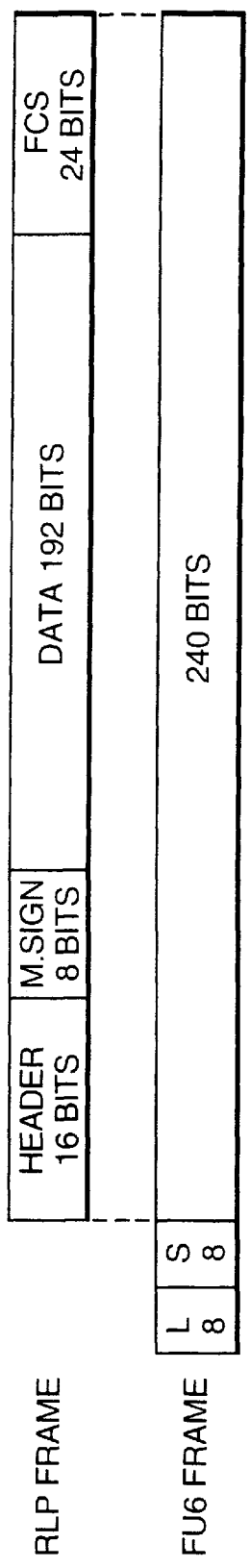
FIG. 7 shows the fitting of an RLP frame into the FU6 frame of the B service by omitting the LU2 CRC field.

If the LU2 checksum field in A/B profile is not added to the end of the RLP packet then the frame will fit exactly into the FU6 frame. The checksum field is not needed because RLP already contains an error check sequence. In this case, RLP would take care of retransmissions, etc. The situation is illustrated in FIG. 7. However, it should be noted that not using the DECT checksum field violates the DECT standards.

The following table presents data rates excluding the modem signal transfer (L2RBOP/L2RCOP) and the headers and FCS fields, i.e. the actual user rate.

| Profile | Rate |
|---|---|
| A profile | 19.2 kbps bi-directional |
| B profile | bearers 19.2 kbps up to maximum 230.4 kbps bi-directional or 441.6 kbps unidirectional |
| C profile | 9.6 kbps bi-directional |

If the FU6 checksum is used in the frame then the RLP frame is segmented into two timeslots by LU2. Thus the first 224 bits of the RLP frame are sent in the first timeslot and the remaining 16 bits with the rest of the frame filled with fill data are carried in the next timeslot. Thus it takes 20 ms to send a single RLP frame (i.e 192 bits of user data) leading to a data rate of 9.6 kbps. Although this is the same as the GSM data rate, it does not use the DECT air interface very efficiently since the user is provided with only 9.6 kbps out of a DECT rate of 24 kbps. This problem can be addressed by mapping more than one RLP frame into the LU2 service and in this way utilising the DECT air interface better. However, since the RLP frames do not arrive continuously the rate may drop and some type of algorithm has to be defined to prevent the FP IWU waiting too long for the arriving RLP frames. The same problem is encountered if frame type FU3, FU4 or FU5 (see document [4]) is used.

This option has the following advantages:

The radio interface would be compatible with other DECT data equipment. This would allow different manufacturers' DECT data equipment to be used with the infrastructure.

The dual mode terminal could be used as access equipment into other DECT data networks.

DLC LU7 Service

In this option the LU7 service (see document [4]) is used for transmissions.

In the case three 240 bit RLP frames could fit exactly into the 72 kbps frame structure. This would offer the maximum of 57.6 kbps user rate. However, the LU7 service is rather complicated to implement, uses double slots and its efficiency is unproven.

This option has the advantage that the terminal could provide ISDN compatibility at least on the U-plane DLC level.

In general, the approach described above has the advantages that it is straightforward to match the RLP and LAPU status in the FP. Nor has the LAPU to be run over the new DECT air interface U-plane connection. This approach could also support seamless handover between DECT and GSM connections. The disadvantage is that the PP has to have a GSM specific protocol (e.g. RLP) running and it can be used only for GSM access bearer services, and nothing else. However, If, for instance, V.120 protocol were used over the A-interface and also over the DECT air interface then the solution would be more general.

The following table lists briefly the advantages and disadvantages of the different options.

| Option | Advantages | Disadvantages | Standards |
|---|---|---|---|
| LU1 service | easy and fast to implement in the DECT voice terminals | high error rate | Ready |
| DECT data profile | data profile compatibility | under-utillsation of the air interface profiles | Ready |
| DECT/ISDN LU7 service | ISDN compatibility | complicated uses double slots | Ready |

Approach 2: Active FP IWU

In this approach the GSM LAP layer is terminated in the FP IWU as defined in the current specification (see document [14]). The FP IWU functionality takes care of an external handover situation according to some specific rules; in other words, the FP behaves differently from normal when it notices that external handover is about to happen.

Figure 8:
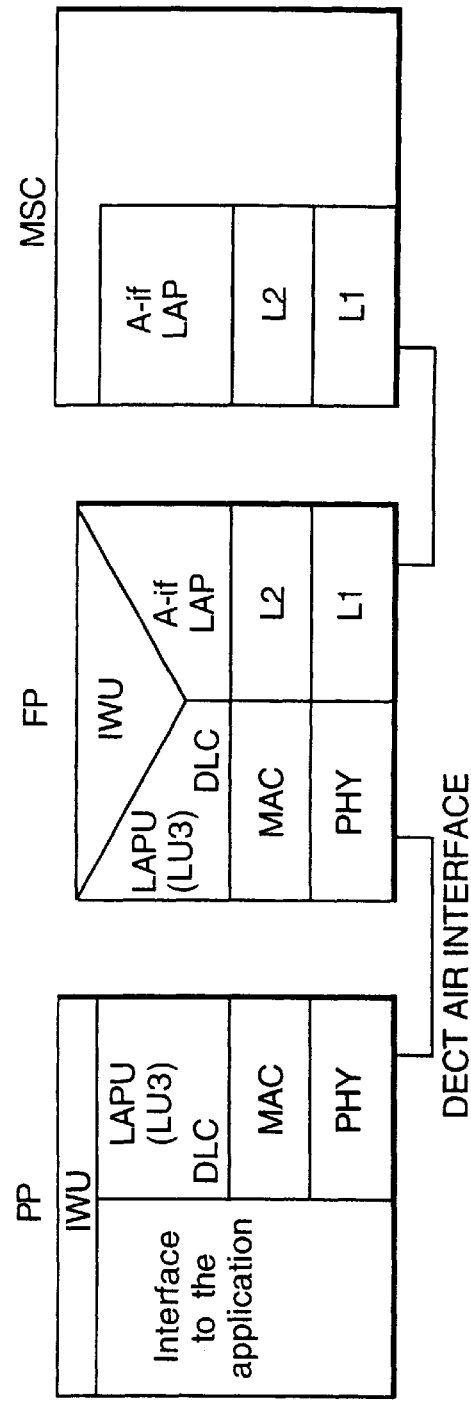
FIG. 8 shows a protocol stack for the situation of an active fixed part interworking unit.

The DECT LAPU and GSM LAP protocols function independently as much as possible; for instance the LAPU's acknowledgements of the DECT air interface are not mapped to the GSM LAP, and the link parameters of the LAPU and GSM LAP are not set in line with each other. Thus, the independent links are configured in the best way possible for the requirement of the separate data links. This is illustrated in FIG. 8.

Incoming data from the GSM LAP is buffered in the DECT LAPU buffers and sent in packets the size of LAPU frames. The same buffering and re-framing is done for traffic in the opposite direction. As defined in the protocols (RLP and LAPU), if no I-frames are waiting for transmission in the protocol buffers, a received I-frame is acknowledged with the Receive Ready (RR) frame. As a result the timers of the protocols do not have to be adjusted greatly, because the entities do not have to wait for end-to-end acknowledgements.

Figure 9:
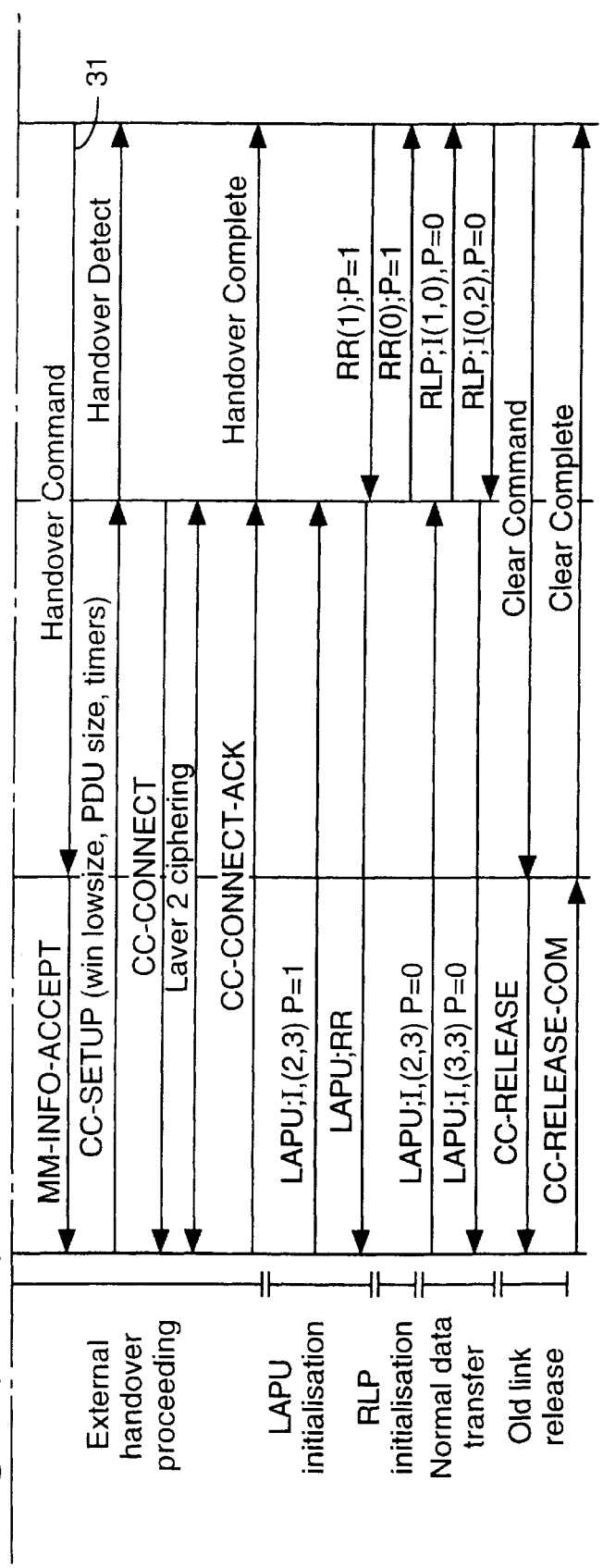
FIG. 9 shows data flow and signalling for the situation of an active fixed part interworking unit.

FIG. 9 shows an example of the data flow and signalling.

Some transfer rules must be established. The FP can recognise the initiation of external handover when it receives {MM-INFO-REQUEST} (at 30 in FIG. 9) from the PP or on receipt of the {HANDOVER COMMAND} (at 31) from the MSC. At the very latest, the old FP has to stop data transmissions to the MSC when the old connection is released.

When the FP notices that external handover is about to happen it stops data transmission to the MSC as well as to the PP. The PP initiates the external handover and flow controls the U-plane. As a result the LAPU sends Receive Not Ready (RNR) to the other peer entity and the FP IWU forwards the RNR to the MSC IWF and to the application at the other end. Thus, no more data is carried to the PP over that air interface.

If a connection interrupt occurs (e.g. if the PP vanishes from range) the FP IWU shall not send GSM LAP acknowledgements of the sent data to the MSC. This leads to a re-transmission of the data frame(s) by the GSM LAP layer entity in GSM IWF to the possible new FP, when the LAP timer expires.

Since the RLP link is running only between the FP and the MSC, in an external handover situation the RLP link has to be re-established between the new FP and the MSC. Since the new FP IWU does not know the status of the RLP entity in the old link, upon external handover the FP in the old link invokes a reset to the RLP entity by issuing the SABM message. (This leads to a reset of the both the RLP entities). However, some of the RLP frames in the MSC are lost due to RLP link reset. AN alternative is for the new FP to wait until the MSC invokes a checkpoint recovery by issuing RR to the new FP RLP entity, in order to receive the status information (this is as described in sub-clause 5.3.3.2 of GSM 04.22, document [21]). The new RLP can then answer the RR information by issuing an RR with an arbitrary N(R) number. This releases the flow control and data transmission continues. However, some data frames may be lost or some sent twice.

This approach requires few changes to the established approach. However, the rules are not rigorous and there may still be some loss of data, especially in the case of an RLP reset in the RLP entity. Thus, flow controlling of the link before handover is important.

Approach 3: Interworking Between the DECT LAPU and GSM A-interface LAP Protocol

According to this approach the DECT LAPU layer acknowledgements are mapped into the GSM LAP acknowledgements. Thus, the acknowledgements are run end-to-end. Possible data errors are, as a result, corrected by a combined GSM LAP/DECT LAPU layer error correction mechanism. There are two options for this interworking: full and half LAP interworking as discussed below. The protocol stack is illustrated in FIG. 10.

Full LAPU/GSM LAP Interworking

In this option, the GSM LAP layer messages are fully interworked to the DECT LAPU layer. For the most part the LAPU entity functions follow the procedures and states of the GSM LAP layer as defined in document [21]. That is, the LAPU layer in the PP behaves, as far as possible, like the GSM LAP layer. The advantage of this is that the LAPU entity in PP functions like a peer entity to the RLP engine in the GSM IWF, thus providing full end-to-end functionality. However, it is difficult to build up this type of system because of the different natures and features of the LAPU and GSM LAP (RLP) protocols.

Figure 11A:
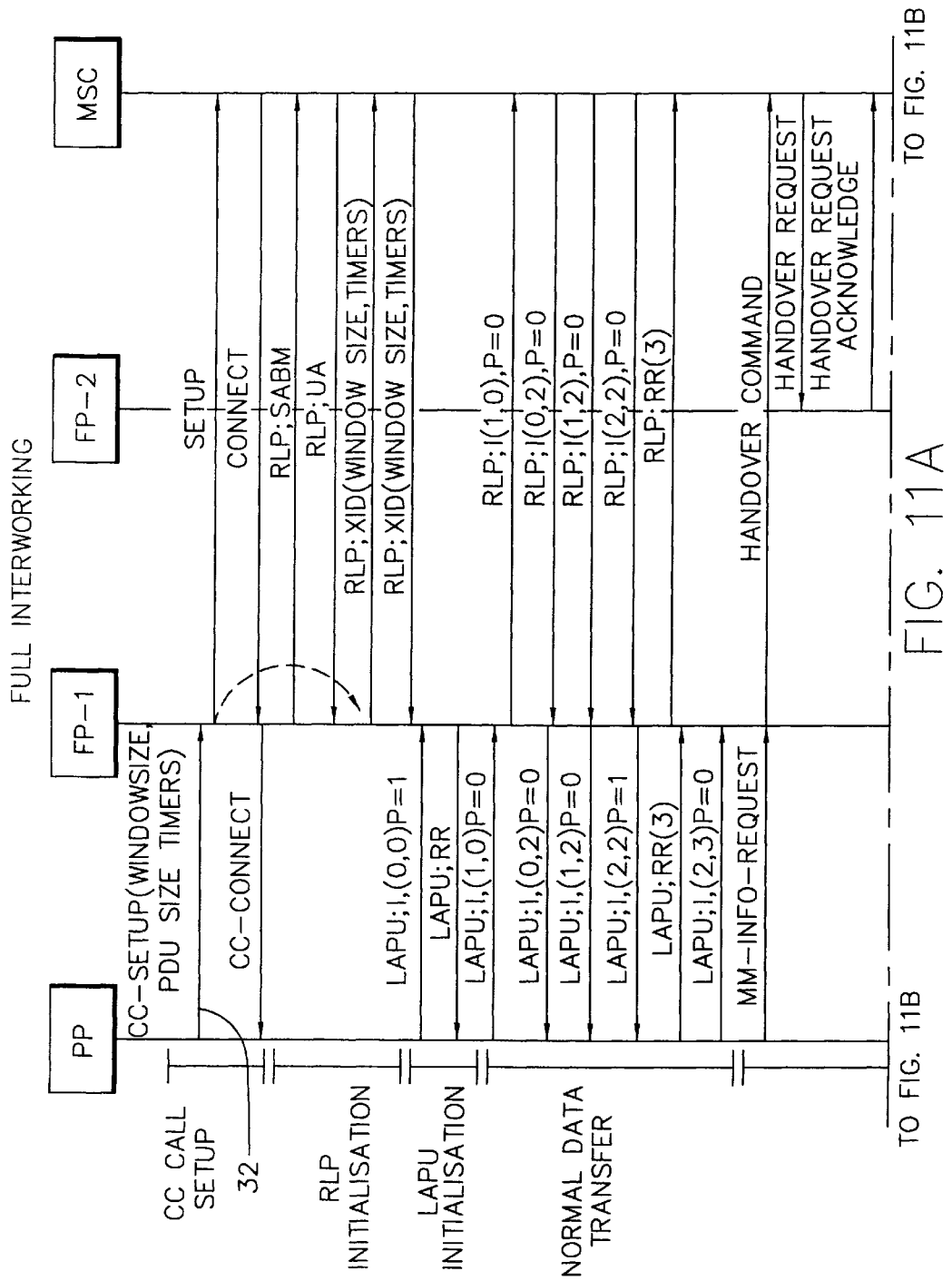
FIG. 11 shows data flow and signalling for the situation of full DECT LAPU/GSM LAP interworking.
Figure 11B:
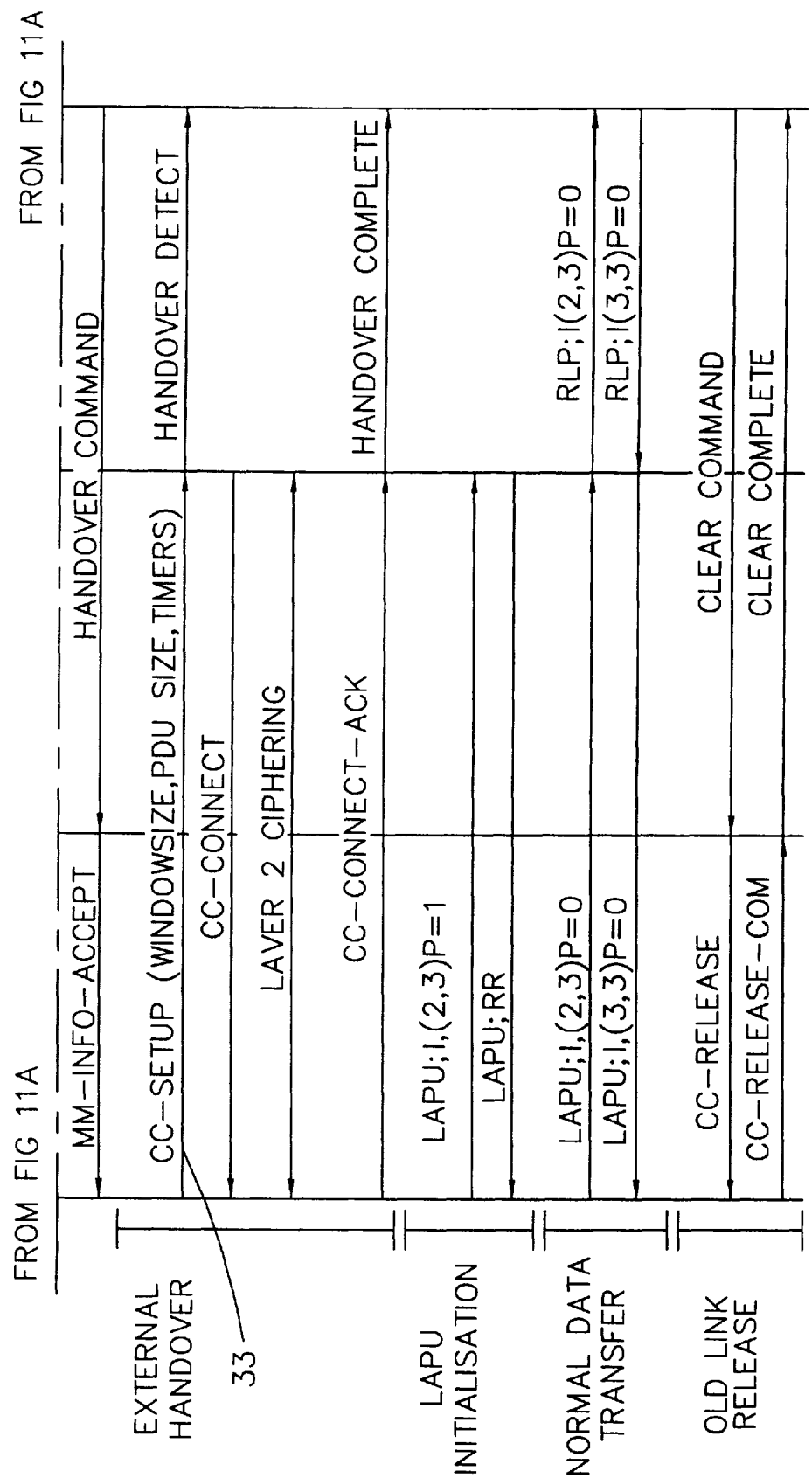

FIG. 11 shows an example of the data flow and signalling.

In this system the LAPU and the RLP are fully interworked in the FP IWU. In the call setup phase in the {CC-SETUP} message (at 32 in FIG. 11) the LAPU window size, PDU length and LAPU re-transmission timer parameters are negotiated. These parameters are aligned with RLP interworking, so the PDU length has the value that the LAPU can carry as the RLP user data in a single LAPU frame. The window size can be anything between 1 and 7 since the RLP can support these lengths. The LAPU re-transmission timer should have a value that is at least the LAPU default value added to the RLP link round-trip delay. RLP XID is used to negotiate the RLP parameters to match DECT requirements. The RLP window size (k parameter) in both direction is the same as in the LAPU, but not larger than 7, which is the limit of the LAPU. The timer T1 (acknowledgement timer) and T2 (replay delay) values are negotiated appropriately to take into account the double link length (LAPU and RLP).

The FP IWU maps the LAPU and RLP messages and parameters one-to-one, as listed in the following table. Thus, each DECT LAPU I-frame carries the contents of one GSM RLP I-frame (I+S-frame). The S- and U-frames are mapped between the LAPU and the RLP.

| LAPU Message | RLP | Parameter mapping |
| --- | --- | --- |
| SABM | SABM | $P/F_{LAPU} = P/F_{RLP}$ |
| UA | UA | $P/F_{LAPU} = P/F_{RLP}$ |
| DECT CC message info | XID | The LAPU/RLP parameter negotiation (see text) |

-continued

| LAPU Message | RLP | Parameter mapping |
| --- | --- | --- |
| I-frame | I + S frame | $N(S)_{LAPU} = N(S)_{RLP}$ |
| | | $N(R)_{LAPU} = N(R)_{RLP}$ |
| | | $P/F_{LAPU} = P/F_{RLP}$ |
| RR | RR | $N(R)_{LAPU} = N(R)_{RLP}$ |
| | | $P/F_{LAPU} = P/F_{RLP}$ |
| RNR | RNR | $N(R)_{LAPU} = N(R)_{RLP}$ |
| | | $P/F_{LAPU} = P/F_{RLP}$ |
| REJ | REJ | $N(R)_{LAPU} = N(R)_{RLP}$ |
| | | $P/F_{LAPU} = P/F_{RLP}$ |
| — | SREJ | No mapping |
| — | DISC | No mapping DECT shall do a LLME LAPU link release |
| — | DM | No mapping |
| — | NULL | No mapping |
| — | TEST | No mapping |

As a result of this functionality the RLP and LAPU functions are synchronised and to a large extent consistent with each other to provide optimised end-to-end error recovery. When an external handover occurs the DECT LLME continues the old LAPU connection over the new radio connection. The LAPU may use in the link initialisation process the values of the old link and start data transmission immediately. When the transmission link is established in the new FP the current values of the LAPU parameters are carried to the new FP in the {CC-SETUP} message <<window size>> parameter (at 33 in FIG. 11). The new RLP entity in the new FP is initialised by using these values. The new RLP may also re-negotiate the parameters by issuing XID to the MSC RLP entity. When the new RLP link has been established, data transmission may continue and the RLP entity in the new FP updates the RLP state parameters according the received/sent frames.

Half LAPU/GSM LAP Interworking

In this option only those GSM LAP layer messages that are needed for acknowledgements are mapped over and the major functionality of the LAP layer lies in the FP. The advantage of this is that implementation of the PP LAPU remains relatively simple, without adding too much complexity to the terminal. In this situation the FP maintains a table containing information about the transferred and received frames in both directions and which RLP information frames was carried in which LAPU frame.

Figure 12A:
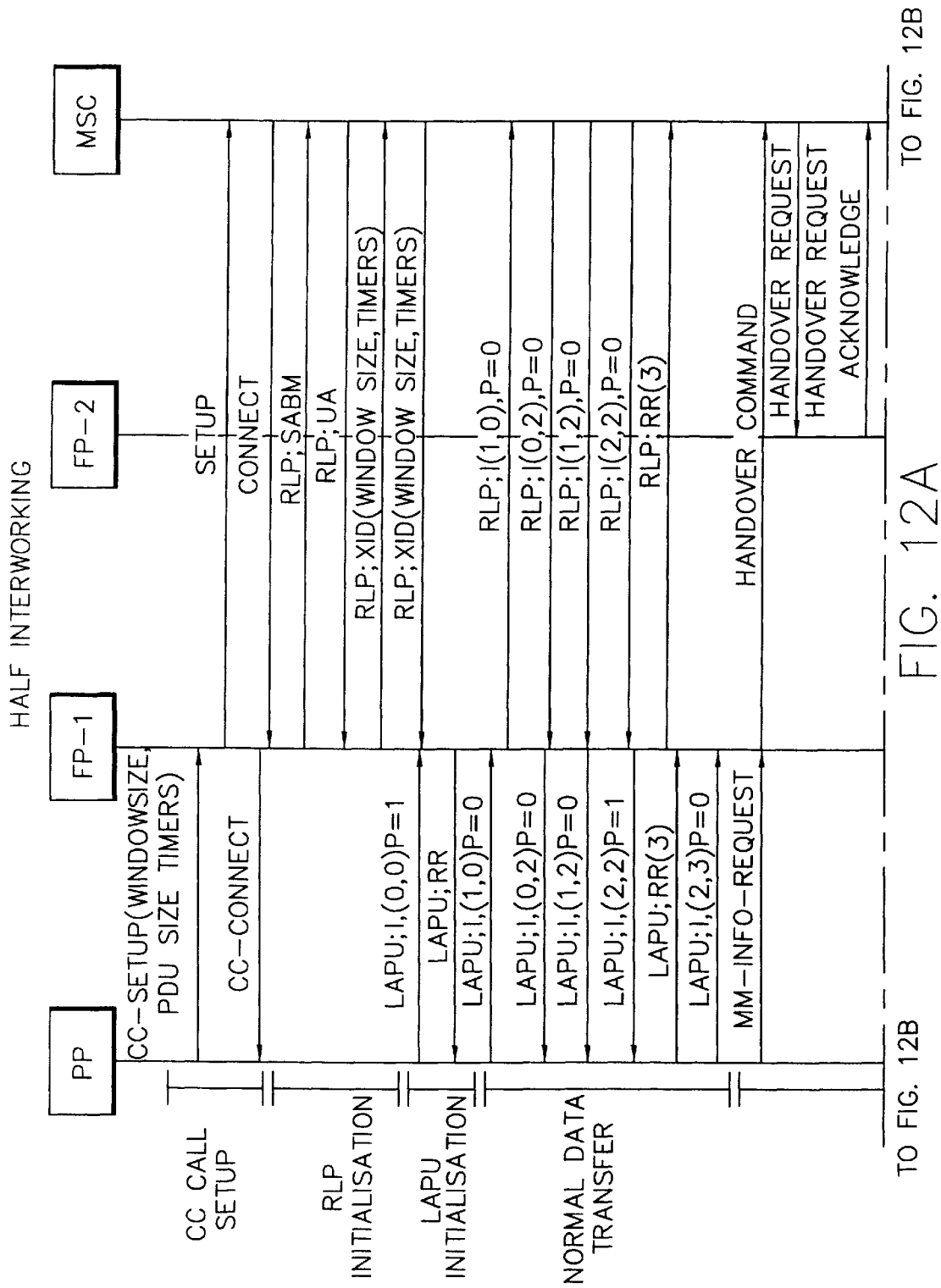
FIG. 12 shows data flow and signalling for the situation of half DECT LAPU/GSM LAP interworking.
Figure 12B:
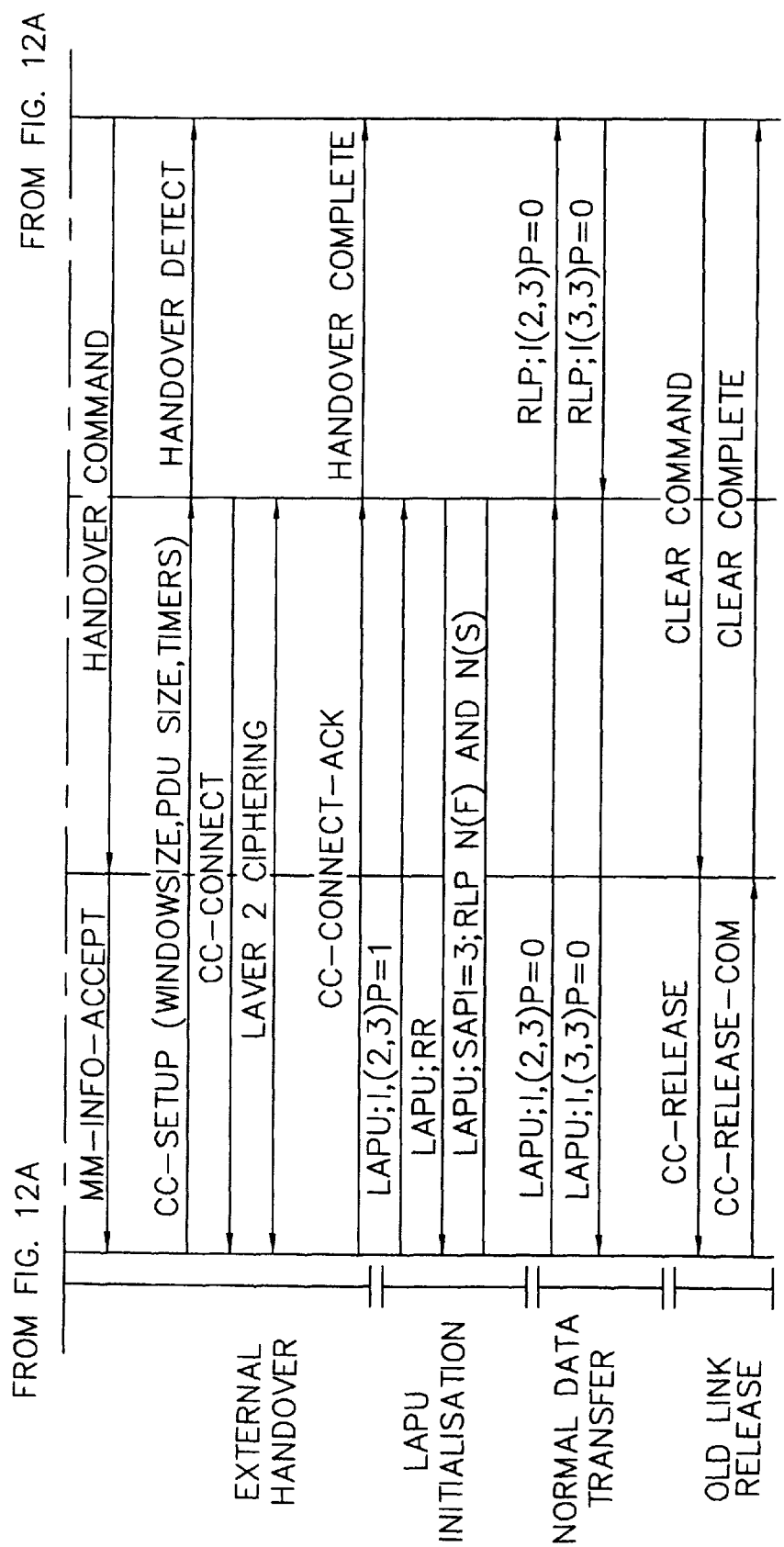

FIG. 12 gives an example of the data flow and signalling. There are two potential modes of operation.

Mode 1

In this case the FP IWU has to maintain a table containing information on which RLP frame carried certain LAPU frame information to the GSM side, and wait for the acknowledgement of that from the MSC IWF. Upon receipt of the acknowledgement for the frame, the FP IWU can derive from the table the acknowledgement to be sent to the PP. The table therefore contains mappings between LAPU N(R) and GSM LAP N(R) variables and LAPU N(S) and GSM LAP N(S) variables. The mapping does not have to be one-to-one: if the LAPU can carry at the same time the data contents of more than one RLP frame then one LAPU response can acknowledge more than one RLP frame.

When the PP initiates external handover, the old LAPU link is flow controlled. After this the LLME in the PP sets the new LAPU link according to the old link variables (N(R) and N(S)); or the link is reset. One of the DECT messages can be used to carry the RLP status information over the DECT air interface to the new FP. The status can also be transferred through the old FP and via the MSC to the target ("new") FP, just before the old link is flow controlled. For instance either DECT call control messages or the DECT LAPU SAPI 3 link can be used to carry the information. The LAPU SAPI 3 link can be coded to indicate the RLP/LAPU status information. Another option is to reset the RLP entity, for example by issuing a SABM message (leading to the reset of the both RLP entities) or by the old RLP in FP 1 being turned into ADM mode (reset) or the new FP invoking a checkpoint recovery in the new FP RLP entity in order to receive the status information from the MSC as described in sub-clause 5.3.3.2 of GSM 04.22 (document [21]).

After this the flow control is released and data transmission continues and the RLP/LAPU reference table is built up again.

Mode 2

In this case the RLP and LAPU link modes are selected so that the send and receive frame counts can be calculated easily between the RLP and LAPU variables. The window size of the RLP should be the same as in LAPU, and the LAPU should send one lot of RLP data contents in a single LAPU frame. By this rule the FP IWU can derive the RLP frame receive and send numbers from the respective LAPU respective. These calculation rules can then be used in external handover, when the new FP cannot know which frames are to be acknowledged towards the MSC. Thus, after external handover the DECT LAPU protocol status can be used as a basis for the calculations to derive which RLP frames need acknowledgements. In this situation no flow controlling is needed because the new FP can calculate the frames received already and acknowledge them or request re-transmission.

In all cases the XID message of the RLP is used to negotiate the RLP parameters (Window size, acknowledge timers, re-transmission attempts and replay delay) to be optimised for the LAPU requirements.

Of the two options discussed above the full interworking solution is the best for avoiding data loss avoiding, but its LAPU implementation may require special effort, which may not be always in line with DECT standards. Mapping the protocol frame counters is not an elegant solution because the LAP protocols usually function independently and the frame counting is a protocol internal matter. The 'half interworking' option does not fully do this but the FP IWU does have to maintain a table, whereby the corresponding acknowledgements over the same links are maintained.

Approach 4: LAPU is Used Between the MSC and the DECT Terminals

In this solution, the DECT LAPU protocol is run all the way to the GSM MSC IWF. This would require major changes in the GSM standard. Because the LAPU protocol is DECT-specific, better candidates for a generic DECT/GSM protocol might be V.120 or HDLC.

The protocol stack for this approach is illustrated in FIG. 13.

References

The following list gives details of the documents referred to above, as well as other relevant documents. Documents ETS 300 175 1 to 8 [1] to [8] and ETRs [9] to [11] give more information about the DECT system. Documents [12] to [18] give more information about DECT/GSM Interworking. Documents [19] to [22] give more information about the DECT data profiles.

[1] ETS 300 175-1 2nd edition: "Radio Equipment and Systems (RES); Digital European Cordless Telecommunications (DECT) Common Interface Part 1: Overview".

[2] ETS 300 175-2 2nd edition: "Radio Equipment and Systems (RES); Digital European Cordless Telecommunications (DECT) Common Interface Part 2: Physical layer".

[3] ETS 300 175-3 2nd edition: "Radio Equipment and Systems (RES); Digital European Cordless Telecommunications (DECT) Common Interface Part 3: Medium access control layer".

[4] ETS 300 175-4 2nd edition: "Radio Equipment and Systems (RES); Digital European Cordless Telecommunications (DECT) Common Interface Part 4: Data link control layer".

[5] ETS 300 175-5 2nd edition: "Radio Equipment and Systems (RES); Digital European Cordless Telecommunications (DECT) Common Interface Part 5: Network layer".

[6] ETS 300 175-6 2nd edition: "Radio Equipment and Systems (RES); Digital European Cordless Telecommunications (DECT) Common Interface Part 6: Identities and addressing".

[7] ETS 300 175-7 2nd edition; "Radio Equipment and Systems (RES); Digital European Cordless Telecommunications (DECT) Common Interface Part 7: Security features".

[8] ETS 300 175-8 2nd edition: "Radio Equipment and Systems (RES); Digital European Cordless Telecommunications (DECT) Common Interface Part 8: Speech coding and transmission".

[9] ETR 015: "Digital European Cordless Telecommunications Reference document".

[10] ETR 043: "Radio Equipment and Systems (RES); Digital European Cordless Telecommunications (DECT) Common Interface Services and Facilities requirements specification".

[11] ETR 056: "Digital European Cordless Telecommunications System description document".

[12] ETS 300 370 2nd edition: Radio Equipment and Systems (RES); Digital European Cordless Telecommunications/Global System for Mobile Communications (DECT/GSM) Interworking profile, Access and mapping (Protocol/procedure description for 3.1 KHz speech service).

[13] prETS 300 499: "Radio Equipment and Systems (RES); Digital European Cordless Telecommunications/Global System for Mobile Communications (DECT/GSM) interworking profile GSM MSC-DECT FP Fixed interconnection".

[14] DE/RES-03071 (September 1995): "Radio Equipment and Systems; Digital European Cordless Telecommunications (DECT),/Global System for Mobile communications (DECT/GSM) inter-working profile, Implementation of bearer services".

[15] (DE/RES-03049) prETS 300 499 (August 1995): "Radio Equipment and Systems (RES); Digital European Cordless Telecommunications/Global System for Mobile Communications (DECT/GSM) Interworking profile, GSM-MSC-DECT-FP Fixed Interconnection"

[16] (DE/RES-03050) (June 1995): "Radio Equipment and Systems (RES); Digital European Cordless Telecommunications/Global System for Mobile Communications (DECT/GSM) Interworking profile, GSM Phase 2 supplementary services implementation"

[17] (DE/RES-03057): "Radio Equipment and Systems (RES); Digital European Cordless Telecommunications/ Global System for Mobile Communications (DECT/GSM) Interworking profile, Implementation of Short message services, point to point and Cell broadcast"

[18] (DE/RES-03058): "Radio Equipment and Systems (RES); Digital European Cordless Telecommunications/ Global System for Mobile Communications (DECT/GSM) interworking profile, Implementation of facsimile group 3"

[19] prETS 300 651: "Radio Equipment and Systems (RES); Digital European Cordless Telecommunications (DECT) Data services profile, Generic data link service, Service Type C, Class 2".

[20] prETS 300 435: "Radio Equipment and Systems (RES): Digital European Cordless Telecommunications (DECT) Data Services Profile Base Standard including interworking to connectionless networks (service types A and B, Class 1)"

[21] GSM 04.22: "Radio Link Protocol (RLP) for data and telematic services on the Mobile Station-Base Station System (MS-BSS) interface and the Base Station System-Mobile-services Switching Centre (BSS-MSC) interface"

[22] prETS 300 701: "Radio Equipment and Systems (RES); Digital European Cordless Telecommunications (DECT) Data Services Profile Generic Frame relay service with mobility (service types A and B, Class 2)"

All these documents are incorporated herein by reference in their entirety.

The present invention includes any novel feature or combination of features disclosed herein either explicitly or implicitly or any generalisation thereof irrespective of whether or not it relates to the claimed invention or mitigates any or all of the problems addressed. In view of the foregoing description it will be evident to a person skilled in the art that various modifications may be made within the scope of the invention.

What we claim is:

1. A method for controlling handover of a DECT portable part from a first DECT fixed part to a second DECT fixed part during provision of a data service, both fixed parts communicating with a GSM mobile switch centre, the method comprising the first fixed part detecting that the handover has been requested, and in response modifying its control of the link between itself and the mobile switch centre to avoid acknowledgement to the mobile switch centre of data which has been received from the mobile switching center at the first fixed part but has not been received by the portable part from the first fixed part.

2. A method as claimed in claim 1, wherein upon handover of the portable part to the second fixed part the second fixed part applies a reset to the link with the mobile switch centre.

3. A method as claimed in claim 1, wherein in response to detecting that the handover has been requested the first fixed part exercises flow control over the link between itself and the mobile switch centre.

4. A method as claimed in claim 3, wherein upon handover of the portable part to the second fixed part the second fixed part releases flow control on the link with the mobile switch centre.

5. A method as claimed in claim 1, wherein the said data comprises at least one frame.

6. A method for controlling handover of a DECT portable part from a first DECT fixed part to a second DECT fixed part during provision of a data service, both fixed parts communicating with a GSM mobile switch centre, the method comprising the first fixed part relaying protocol messages between its link with the portable part and its link with the mobile switch centre according to a predetermined mapping, to avoid acknowledgement to the mobile switch centre of data which has been received from the mobile switching center at the first fixed part but has not been received by the portable part from the first fixed part.

7. A method as claimed in claim 6, wherein the mapping is a one-to-one mapping between protocol messages of the two said links.

8. A method as claimed in claim 6, wherein the said protocol messages of the link between the first fixed part and the portable part are DECT LAPU protocol messages.

9. A method as claimed in claim 6, wherein the said protocol messages of the link between the first fixed part and the mobile switch centre are GSM LAP protocol messages.

10. A communications system comprising: a GSM mobile switch centre; a first DECT fixed part, and a second DECT fixed part in communication with the mobile switch centre; and a DECT portable part in communication with the first fixed part; wherein in at least the provision of data service communications to the portable part a protocol is applied all the way between the mobile switch centre and the portable part via the first fixed part, the protocol including an acknowledgement to the mobile switch centre of data which has been received from the mobile switch centre at the first fixed part; and wherein during a handover of the portable part from the first fixed part to the second fixed part, there is avoidance of the acknowledgement.

11. A communications system as claimed in claim 10, wherein the said protocol is the GSM LAP protocol.

12. A communications system as claimed in claim 10, wherein the portable part includes means for encoding and decoding signals according to the said protocol.

13. A communications system as claimed in claim 10, wherein the said protocol provides for the division of data into frames and each of those frames is communicated between the portable part and the fixed part in a single DECT data link control frame.

14. A communications system as claimed in claim 10, wherein the said protocol is the DECT LAPU protocol.

15. A communications system as claimed in claim 14, wherein the mobile switch centre includes means for encoding and decoding signals according to the said protocol.

16. In the combination of a GSM communication system including a mobile switching center, a first DECT communication system including a first DECT fixed part, and a second DECT communication system including a second DECT fixed part, wherein each of the first and the second DECT fixed parts is operative for communication with a DECT portable part over an air interface and communication with the mobile switching center via a link, thereby allowing the mobile switching center to communicate data to the DECT portable part via either one of the first or the second DECT fixed parts, each of which is operative to acknowledge to the mobile switching center receipt of said data, a method for controlling handover of the DECT portable part from the first DECT fixed part to the second DECT fixed part during provision of a data service, the method comprising steps of:

the first fixed part detecting that the handover has been requested and, in response, modifying control by the first fixed part of the link between the first part and the mobile switching center to avoid acknowledgement to the mobile switching center of said data.

17. In the combination of a GSM communication system including a mobile switching center, a first DECT communication system including a first DECT fixed part, and a second DECT communication system including a second DECT fixed part, wherein each of the first and the second DECT fixed parts is operative for communication with a DECT portable part over an air interface and for communication with a mobile switching center via a link, thereby allowing the mobile switching center to communicate data to the DECT portable part via either one of the first or the second DECT fixed parts, a method for controlling handover of the DECT portable part from the first DECT fixed part to the second DECT fixed part during provision of a data service, both of the fixed parts communicating with the GSM mobile switching center, the method comprising steps of:

the first DECT fixed part relaying protocol messages between its interface with the DECT portable part and its link with the mobile switching center according to a predetermined mapping, the relaying step providing for an avoiding of acknowledgement to the mobile switching center of data which has been received from the mobile switching center at the first DECT fixed part but has not been received at the DECT portable part.

* * * * *